(12) United States Patent
Falk

(10) Patent No.: US 6,835,172 B2
(45) Date of Patent: Dec. 28, 2004

(54) CALIBRATION SYSTEM WITHOUT USING POTENTIOMETERS

(75) Inventor: Steven M. Falk, Baltimore, MD (US)

(73) Assignee: Datex-Ohmeda, Inc., Madison, WI (US)

( * ) Notice: Subject to any disclaimer, the term of this patent is extended or adjusted under 35 U.S.C. 154(b) by 0 days.

(21) Appl. No.: 10/675,326

(22) Filed: Sep. 29, 2003

(65) Prior Publication Data

US 2004/0062288 A1 Apr. 1, 2004

Related U.S. Application Data

(62) Division of application No. 09/756,818, filed on Jan. 9, 2001.

(51) Int. Cl.[7] .......................... H01H 35/00; A61G 11/00
(52) U.S. Cl. ........................................... 600/22; 200/61
(58) Field of Search ..................... 600/22, 21; 219/385; 392/416; 200/61; 119/318, 218; 237/2 R, 3 R, 4, 14; 236/2–6

(56) References Cited

U.S. PATENT DOCUMENTS

| | | | | |
|---|---|---|---|---|
| 4,331,161 A | * | 5/1982 | Patel | 600/549 |
| 5,759,149 A | * | 6/1998 | Goldberg et al. | 600/22 |
| 5,792,041 A | * | 8/1998 | Kobayashi et al. | 600/22 |
| 5,817,003 A | * | 10/1998 | Moll et al. | 600/22 |
| 6,036,634 A | * | 3/2000 | Goldberg et al. | 600/22 |
| 6,048,304 A | * | 4/2000 | Koch | 600/22 |
| 6,296,606 B1 | * | 10/2001 | Goldberg et al. | 600/22 |

* cited by examiner

Primary Examiner—Daniel Robinson
(74) Attorney, Agent, or Firm—Roger M. Rathbun

(57) ABSTRACT

A calibration system for use with a radiant heater of an infant apparatus such as an infant warmer or an infant incubator. The system includes an electrical circuit that is used to sense the temperature of the infant by means of a thermistor and to provide a digital signal representative of the temperature. An automatic calibration system avoids the use of potentiometers by inputting two known voltages into the circuit by means of a voltage divider and recording the digital output for each voltage input. The two known voltage inputs and the known digital outputs are used in two equations to solve for the span and offset constants in those equations. Once determined, those constants are used to calibrate the system.

10 Claims, 1 Drawing Sheet

CALIBRATION SYSTEM WITHOUT USING POTENTIOMETERS

REFERENCE TO RELATED PATENT APPLICATIONS

The present patent application is a divisional application of U.S. Ser. No. 09/756,818, filed Jan. 9, 2001 and entitled Calibration System Without Using Potentiometers.

BACKGROUND

The present invention relates to a method and system to carry out the calibration of an electrical instrument or circuit without the need for a potentiometer, and, more particularly, to the use of a method and a system with an application of a temperature sensor, such as a thermistor to read out a sensed temperature or to provide a signal indicative of a sensed temperature for inputting to a further control system.

In the treatment of infants, and particularly those born prematurely, it is necessary to provide heat to the infant during the treatment of such infants and to minimize the heat loss of the infant. Accordingly, there are various types of infant care apparatus to provide that heating, among such apparatus are infant warmers and infant incubators. In general, the infant warmer comprises a flat, planar surface on which the infant rests while some procedure is being carried out on the infant. There are normally protective guards that surround the infant to keep the infant contained within the apparatus and there is an overhead heater that directs radiant energy in the infrared spectrum toward the infant to impinge upon that infant to provide warmth.

Infant incubators, on the other hand generally are of a more protective atmosphere that enclose the infant in a infant compartment where the temperature and perhaps humidity is also controlled and, in essence, the infant is contained in an enclosed chamber and provided with a controlled environment. While the present invention can be used with an infant warmer, an infant incubator, or with various other types of equipment, the description hereinafter will be directed mainly to the use of that invention in the context of an infant warmer as a typical use of the invention.

An infant warmer is shown and described in U.S. Pat. No. 5,474,517 of Falk and is an example of the type of infant care apparatus that is used to provide warmth to an infant while carrying out some procedure on that infant.

With the use of infant warmers, there is normally provided a means to sense a temperature and to display that temperature or use the signal representing that temperature in digital form for some further signal processing. In general, one device normally used for such temperature sensors is a thermistor and such devices are certainly widely used in infant warmers. The electrical circuits used to determine the temperatures sensed by thermistors are also well known and utilize the phenomena of a thermistor that the resistance of the device changes with the temperature of its environment. Thus, as used herein, reference will be made to a signal from a thermistor representative of temperature however, it will be understood that the signal is a derived signal obtained by normal circuitry and in reality is measuring the change in resistance of the thermistor device.

With infant warmers, the thermistor is normally placed on or affixed to the infant to detect the skin temperature of that infant. The signal from the thermistor in analog form is used to display the infant temperature while that signal representative of the infant skin temperature is also used as an input to the overall control system that regulates the intensity of the heat directed toward the infant to provide the warmth to the infant. One system used to control a radiant heater is shown and described in U.S. Pat. No. 5,162,038 of Wilker. In that patent, the control system uses a difference between the sensed patient temperature and a set point temperature inputted by the user to operate a proportional control loop and that proportional control technique adjusts the power to the heater.

As a common component of temperature sensing systems using one or more thermistors, for example, there is a need to calibrate the system to ensure the accuracy of the thermistor signal. In particular, the most common means of carrying out the calibration is by means of a potentiom ter, or pot, and normally two pots are needed that can adjust the span and offset of the signal from the thermistor. Thus, for each thermistor that is installed, it is necessary to calibrate the thermistor against some standard and carry out the fine tuning or adjustment of two pots to insure that each thermistor is providing an accurate signal for use by the control system.

In general, such calibration is carried out initially at the facilities of the manufacturer of the apparatus and thereafter a re-calibration may be undertaken on a regular, established basis, in the range of about once a year. In each re-calibration, the normal calibration using potentiometers is carried out by a biomedical engineer or biomedical technician that is professionally trained to carry out the procedure. The conventional calibration procedure, for example, on an infant warmer utilizing a thermistor, is to remove the thermistor and to replace it with an extremely accurate precision resistor that is known to result in a predetermined temperature readout at the temperature display instrument.

Thus, the engineer or technician must tweak or adjust two potentiometers for each thermistor. Since the adjustment of one potentiometer, for example, the one adjusting the span calibration constant will have an effect on the other potentiometer, such as the offset calibration constant, the technician must continue make changes to both potentiometers as a balancing act to eventually arrive at the correct temperature indication at the temperature display instrument. After that correct reading is achieved, a second extremely precise resistor is substituted into the circuit and with its resistance designed to result in a second known readout temperature to achieve two points on the calibration curve for the thermistor circuit and the same procedure repeated for the second precise resistor with the tweaking of the two potentiometers to get the correct readout temperature on the temperature display instrument. In cases where the technician is highly skilled and/or fortunate, the procedure can take about 15 minutes per reading and at times, the procedure for one reading may take in excess of an hour. Accordingly. as can be seen, the procedure of re-calibration is considerably time consuming and is a detailed procedure requiring a skilled engineer or technician.

While the aforedescribed re-calibration procedure is usable, it can be seen that it is quite difficult for the user to individually tweak or adjust various pots in a system, particularly where there may be a plurality of thermistors used, each having a pair of pots that need individual adjustment by a biomedical technician or biomedical engineer to carry out the calibration of such thermistors.

Accordingly, it would be advantageous to have a system that eliminates entirely the use of the potentiometers in carrying out the calibration and re-calibration of thermistors so as to have an automatic electronic system of calibration that does not require the time consuming tweaking or adjusting of the individual potentiometers.

SUMMARY OF THE INVENTION

Accordingly, the present invention relates to a method and system to carry out the calibration of a thermistor based system that eliminates the need to use a pot, that is, the system can be calibrated by an automatic electrical function that does not require a trained, highly skilled biomedical engineer or biomedical technician to physically tweak of adjust any pots in order to proper calibrate the thermistor signal for use with a control system or other use.

In carrying out the invention, a system is employed that uses two calibration voltages imposed on the system through a voltage divider circuit where the normal thermistor is eliminated from the circuit electrically and the resulting signals from the system are measured. Thus, at no time does one or more precision resistors need to be substituted into the circuit in place of the thermistor. Instead, the two known voltages are imposed automatically on the circuit and the outputs for those voltages measured. By use of those known values of input voltages and those measured values of the corresponding outputs, the system utilizes a series of equations that solve for the constants, that is, with the use of the known input signals and the measured output signals, the equations enable the system to determine the actual values for the span and the offset constants. Thus, with that information, there is simply a set of two equations having two unknowns and the equations can be solved by a microprocessor to determine the values for the unknowns, that is, the values for the offset and the span constants.

Once the span and offset constants are known, they can be incorporated into a look up table in the system memory or used in an equation carried out by a microprocessor to enable the system to correctly use the output signal with the system in actual use in measuring the temperature of an infant and determine the precise value of the temperature sensed by the thermistor or use that corrected signal for further use in the heating control system.

Additional features and advantages of the invention will become apparent to those skilled in the art upon consideration of the following detailed description of preferred embodiments exemplifying the best mode of carrying out the invention.

DETAILED DESCRIPTION OF THE INVENTION

Figure 1:
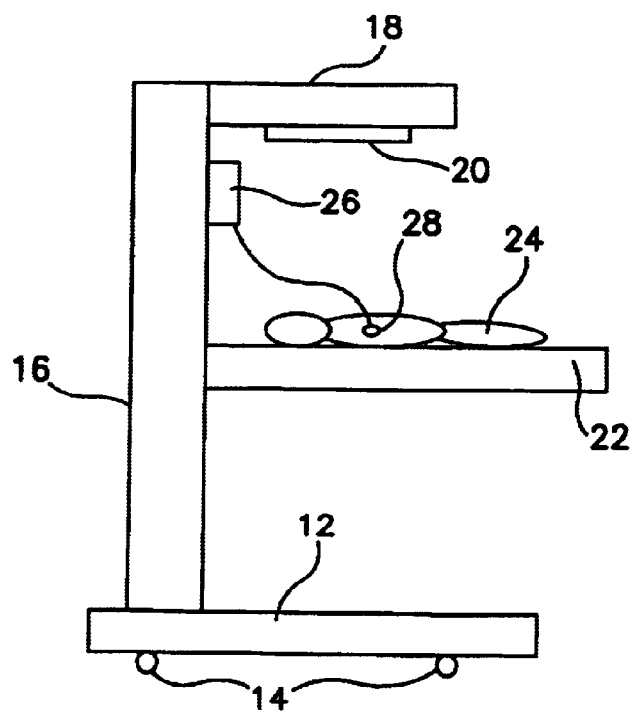
FIG. 1 is a schematic view of a radiant infant warmer showing an infant in position and utilizing a skin temperature sensor affixed to the infant.

Turning now to FIG. 1, there is shown a schematic view of an infant warmer 10 that can be used to incorporate the present invention. As can be seen, the infant warmer 10 is of a conventional construction, basically like that shown and described in the aforementioned Falk U.S. Patent and which comprises a base 12 that may include rollers 14 to allow the infant warmer to be moved conveniently from one location to another. A vertical member 16 extends upwardly from the base 12 to support a heating member 18 that extends outwardly from the upper portion of the vertical member 16 and which supports a heater 20.

An intermediate infant platform 22 is also preferably supported in cantilever fashion from the vertical member 16 and which provides support for the infant 24. Generally, as is conventional, the infant platform 22 has an upper planar surface to support the infant 24 and includes guards (not shown) surrounding the peripheral edge of the infant platform 22 to protect the infant from inadvertently falling from the infant warmer 10. Thus, as shown, the heater 20 provides a source of energy in the infrared spectrum that is directed toward the infant 24 lying upon the infant platform 22 in order to warm the infant 20 while a procedure may be carried out on the infant.

As a further component of the infant warmer 10, there is a control and monitor module 26 supported by the vertical member 16 to provide a location for the various monitors that are needed by the user in caring for the infant 24 as well as for the various controls required for the overall function of the infant warmer 10.

The module 26 may also include, therein, the electronic components needed to provide control for the heater 20 in a manner desired by the user. As can also be seen, a temperature sensor, such as a thermistor 28 is affixed to the skin of the infant and provides an analog signal to the module 26, as will be explained, that is indicative of the skin temperature of the infant 24 and which is used as an input to the control system for the heater 20. Again, as explained, the thermistor does not actually produce a electrical signal but a signal is produced that is a measurement of the resistance of the thermistor and which, as is conventional, is representative of the temperature of that thermistor.

As a brief summary of the operation of the infant warmer, and again which is fairly conventional, the infant warmer 10 supplies a continuous source of heat to the infant 24, and, in most cases, there is a manual control mode of the heater intensity where the heater intensity is simply set by the user directly and independent of any measured temperature of the infant and, alternately, there is a servo controlled mode that controls the intensity of the heater in accordance with a set point temperature inputted by a user and which is further controlled by the temperature sensor that is affixed to the infant that provides a signal indicative of the skin temperature of the infant. A control system using such parameters and inputs is shown and described in U.S. Pat. No. 5,162,038 of Wilker.

Figure 2:
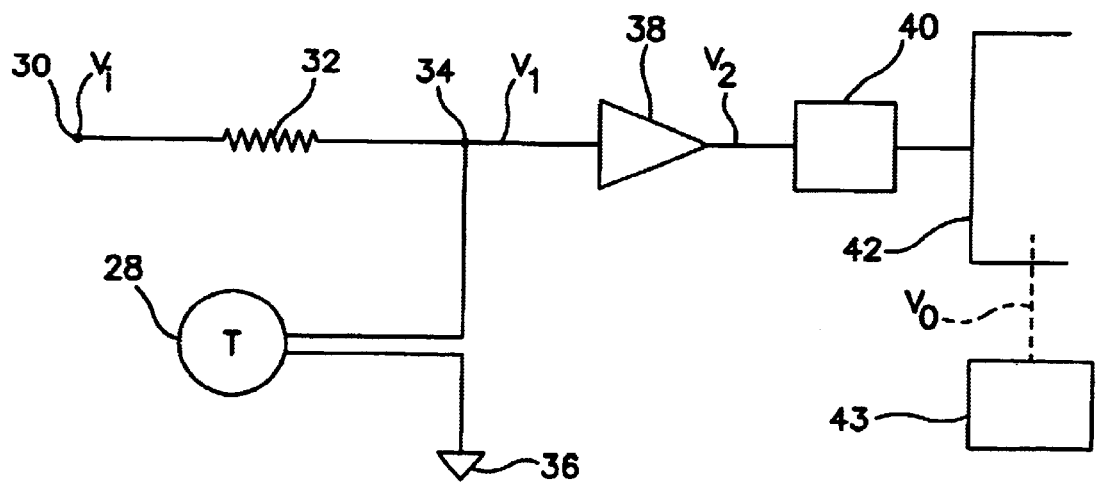
FIG. 2 is a schematic view of the electrical components used in carrying out the present invention.

Turning now to FIG. 2, there is shown a schematic view of the various electronic components utilized in carrying out the present invention. As can be seen in FIG. 2, there is an electrical circuit having a input point 30 leading to a resistor 32 and a junction point 34. The thermistor 28 is provided between the junction point 34 and a ground connection 36. Leading from the junction point 34 is a differential amplifier 38, an integrator 40 and leading to an analog to digital converter 42 (ADC). That digital output from the ADC 42 can be read as a temperature from the temperature display instrument 43.

Accordingly as can be seen, the thermistor 28 is a resistive element in a voltage divider with the other resistor being the resistor 32. It is important in carrying out the present invention that the resistor 32 be a precision resistor with a tolerance of + or −0.1%. As an example, the resistor 32 is 5.76 k ohm for the 10K thermistor. Thus, at the top of the voltage divider, that is, at input point 30, the input is approximately 1.0 volts. The 1 volt reference voltage and the resistor 32 insure that the maximum current through the thermistor 28 is approximately 100 uA and which is less the self-heating levels.

As also seen, for purposes of illustrating the present invention are the voltages in the system taken at various points along the circuit, that is, $V_i$ is the voltage taken at the input point 30, $V_1$ is the voltage prior to the differential amplifier 38, $V_2$ is the voltage after the differential amplifier 38 and $V_O$ is the voltage in digital form from the ADC 42. The resistance of the resistor 32 is R and the resistance of the thermistor 28 is $R_T$.

As another important parameter of the system to be explained, the ADC 42 must be of a high resolution and a large number of steps such the voltage to be inputted to the ADC 42 is always within the range of the ADC 42.

Thus, with the system as shown:

$V_1 = (R_T/R+R_T) \times V_i$ and $V2 = Gain(G) \times V_1$

Since steady state signals go through:

$V_O = V_2$; thus $V_O = G \ V_i(R_T/R+R_T)$—noting that $V_O$ is the read voltage to the temperature display instrument 43.

Accordingly, in carrying out the present invention, the thermistor is electrically isolated from the system by means such as a switch, (not shown) and two different voltages are inputted at the input point 30. By taking the thermistor 28 out of the circuit, $V_1$ will then equal $V_i$.

And thus there is the equation $V_O = mGV_i + b$; where m and b are the constants of the system representing the span and the offset and are constant since the system remains the same.

Thus by inputting two known voltages at input point 30 of A volts and B volts, i.e $V_A$ and $V_B$, we have $V_{OA} = mV_A + b$ and $V_{OB} = mV_B + b$ Since $V_A$ and $V_B$ are known, having been inputted as known voltages and $V_{OA}$ and $V_{OB}$ can be read as digital outputs from the ADC 42, there are two equations and two unknowns and those equations can readily be solved by means of a microprocessor that can solve the equations simultaneously and obtain the values for the constants m and b, i.e. the offset and span constants.

Thus by isolating the thermistor 28 from the circuit by means of an automatic switch that can be activated when the calibration is desired and then the two different voltages applied to the point 30 and the digital voltage signals from the ADC 42 are read for each of the input voltages, the overall system can carry out the calibration procedure and obtain the span and offset constants for that particular circuit. The system microprocessor thus determines those constants and those constants thereafter used to formulate a look up table that is stored in a memory of the system or the constants are used in the same equation i.e. $V_O = mV_i + b$ carried our by a microprocessor and used each time a temperature is to be read from the output of the ADC 42 to the temperature display instrument 43.

As can therefore be seen, when it is desired to carryout a calibration of the system having a thermistor, the user only needs to start the process and the two input voltages can be automatically applied to the circuit and the output digital signals from the analog to digital converter automatically read and the microprocessor can simply use the values in the two equations to solve for m and b, the span and the offset constants for that particular system. Those constants can be stored and updated periodically as desired by the user, and the system is automatically calibrated without the need for a technician to individually adjust or tweak any potentiometers.

Those skilled in the art will readily recognize numerous adaptations and modifications which can be made to the calibration system of the present invention which will result in an improved system yet all of which will fall within the scope and spirit of the present invention as defined in the following claims. Accordingly, the invention is to be limited only by the following claims and their equivalents.

I claim:

1. A method of calibrating an electrical circuit for sensing a temperature, said method comprising the steps of:
   a. providing a temperature sensor,
   b. providing an electrical circuit adapted to receive a signal from the temperature sensor and to produce an output signal indicative of the sensed temperature of the temperature sensor,
   c. inputting at least two different predetermined electrical voltage signals to the circuit,
   d. analyzing the output signals representative of the output of each of the at least two input voltage signals,
   e. using a set of equations equal to the number of the at least two input voltage signals to determine the constants in the equations, and
   f. using the determined constants to calibrate the electrical circuit.

2. A method as defined in claim 1 wherein said step of providing a temperature sensor comprises providing a thermistor.

3. A method as defined in claim 2 wherein said step of using a set of equations comprises using two equations, each corresponding to one of said input voltage signals.

4. A method as defined in claim 1 wherein said step of providing an electrical circuit includes providing an electrical circuit having a voltage divider.

5. A method as defined in claim 1 wherein said step of providing an electrical circuit includes providing an electrical circuit having an analog to digital converter and wherein said output signal is in digital form.

6. A method as defined in claim 1 wherein said step of using a set of equations comprises using the equation $Vo = mV_1 + b$ and solving for the constants m and b.

7. A method of calibrating an electrical circuit, said method comprising the steps of:
   a. providing an electrical component producing a signal representative of a sensed parameter,
   b. providing an electrical circuit adapted to receive a signal from the electrical component and to produce an output signal indicative of the sensed parameter,
   c. inputting at least two different predetermined electrical voltage signals to the circuit,
   d. analyzing the output signals representative of the output from each of the at least two input voltage signals,
   e. using a set of equations equal to the number of the at least two input voltage signals to determine the constants in the equations, and
   f. using the determined constants to calibrate the electrical circuit.

8. A method of calibrating an electrical circuit as defined in claim 7 where said step of inputting at least two known electrical voltage signals comprises inputting two voltage signals and said step of using a set of equations comprises using two equations having two unknowns.

9. A method of calibrating an electrical circuit as defined in claim 8 wherein said two unknowns are the span and offset constants for said circuit.

10. A method of calibrating and electrical circuit as defined in claim 9 wherein said sensed parameter is temperature.

* * * * *